Oct. 31, 1961
J. B. SNOY
3,006,219
TRANSMISSION CONTROL
Filed March 13, 1958
2 Sheets-Sheet 1
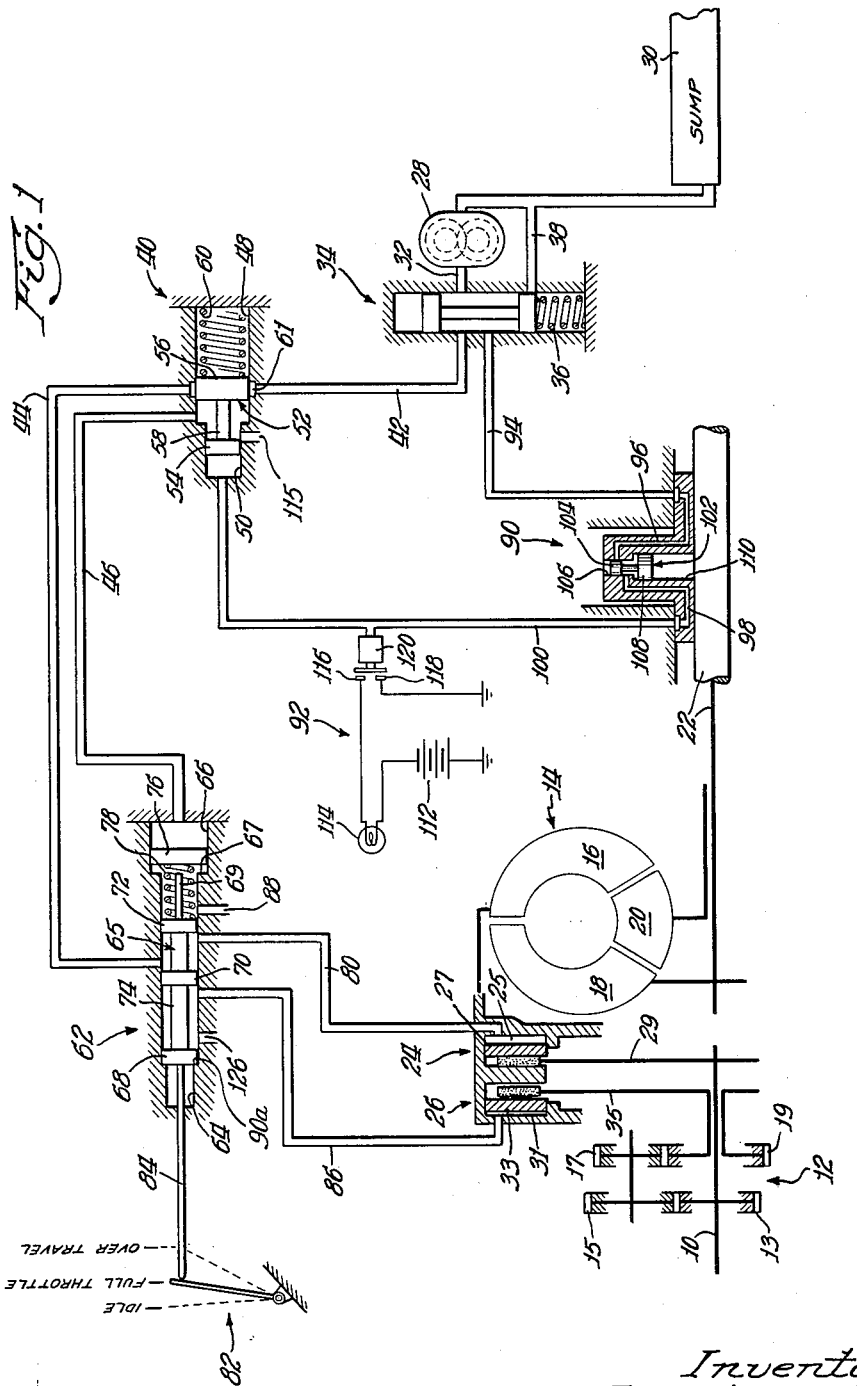
Inventor:
Joseph B. Snoy
By: Francis T. Drumm
Atty.

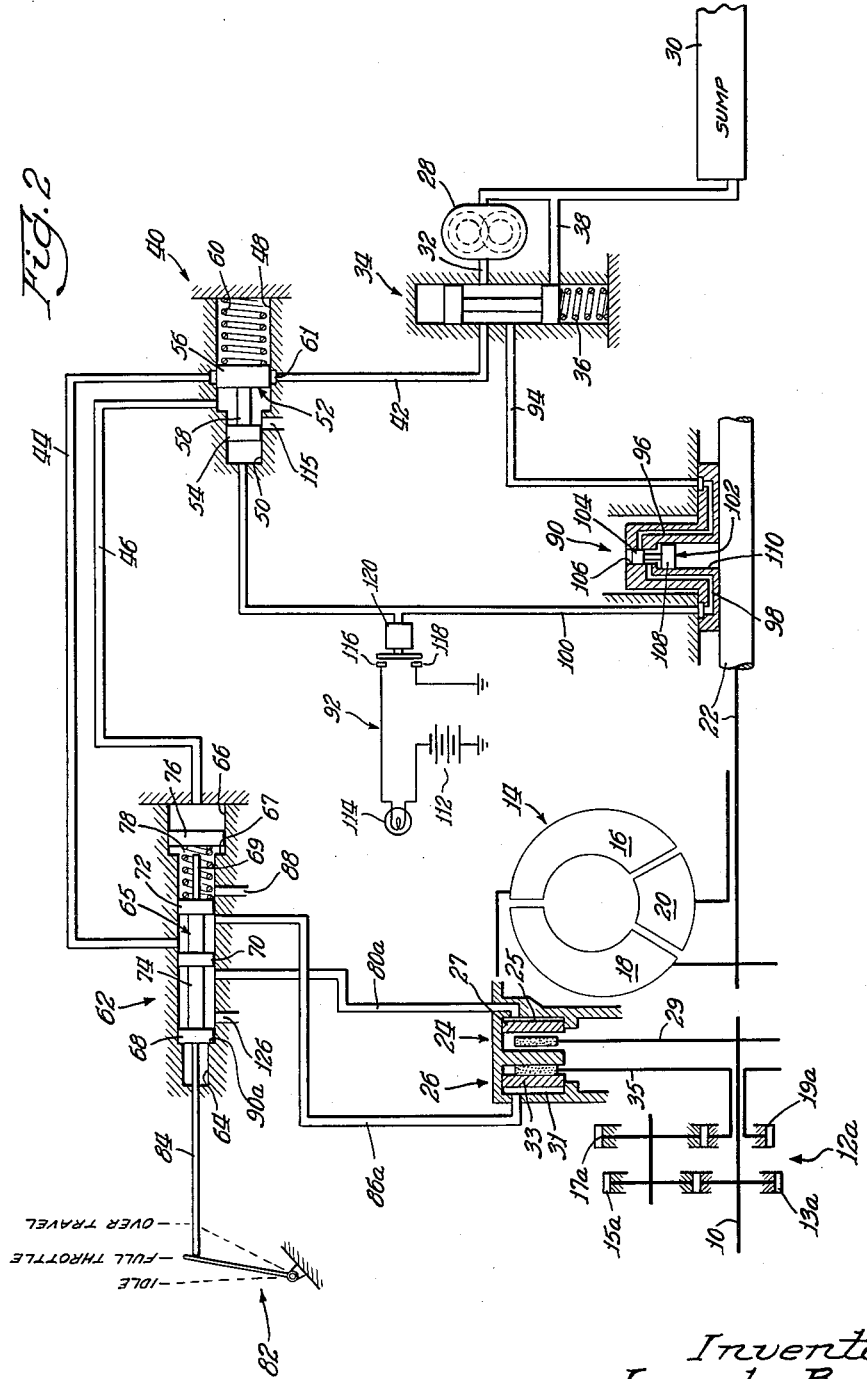

United States Patent Office 3,006,219
Patented Oct. 31, 1961

3,006,219
TRANSMISSION CONTROL
Joseph B. Snoy, Rockford, Ill., assignor to Borg-Warner Corporation, Chicago, Ill., a corporation of Illinois
Filed Mar. 13, 1958, Ser. No. 721,198
4 Claims. (Cl. 74—730)

This application relates to automatic power transmissions for vehicles and the like and more particularly to a control apparatus for an automatic transmission of the geared input multiple-range type.

This invention is directed primarily to a control for maintaining the input to a transmission having a torque converter at the lowest ratio at part throttle for best economy. In addition, the invention includes the provision of a manually operable downshift for acceleration, a means for preventing downshifting when the converter turbine speed exceeds a certain value and a means for indicating when manual shifting to a lower range is desirable.

The present control is intended for use with a transmission having a number of speed ranges after the converter in geometric steps. One or the other of these ranges may be manually selected by the operator for economical operation of the vehicle under particular conditions. There is a point in the most economical range corresponding to a particular turbine speed above which no gain can be made in performance by downshifting into a lower range. Moreover, greater performance can be obtained at lower turbine speeds by shifting into a lower range.

Accordingly, a principal object of the invention is to provide a control apparatus for transmissions of the stated type wherein improved means are provided for effecting downshifting of the input gearing to a higher ratio within the performance range and for precluding downshifting when a pretetermined speed value is reached.

A further object of the invention is to provide a control of the mentioned type in which means are provided for indicating to the operator that a manual selection of a lower operating range is feasible.

In particular, the present invention involves the provision of a hydraulic system wherein the input gearing may be downshifted for efficient operation within a particular range of converter operation and within the lower range of vehicle speed and in which means including a centrifugal governor are provided for preventing operation of the downshift in the upper range of vehicle speeds. The present invention contemplates downshifting from direct drive to an underdrive relation, and from overdrive to a direct drive relation.

This invention consists of the novel constuctions, arrangements, and devices to be hereinafter described and claimed for carrying out the above-stated objects and such other objects as will be apparent from the following description of preferred forms of the invention, illustrated with reference to the accompanying drawings, wherein:

FIGURE 1 is a diagrammatic view of a control apparatus made in accordance with the present invention; and FIGURE 2 is a diagrammatic view of a control apparatus made in accordance with a modified form of the present invention.

Referring to the drawings and more particular to FIGURE 1, the control apparatus of the present invention includes an input shaft 10, an underdrive input gear set 12, a torque converter 14 having an impeller 16 a turbine 18 and a stator 20, and an output shaft 22 fixed to the turbine 18. In the form of the invention shown in FIGURE 1, the impeller 16 is, at vehicle operating speeds, driven directly by the input shaft 10 through the medium of a clutch 24. Alternately the impeller 16 may be driven through the input gear set 12 by engaging a clutch 26 in a manner hereafter apparent.

The gear set 12 includes a gear 13 fixed to the shaft 10, a gear 15 in mesh with the gear 13, a gear 17 rotatable with the gear 15 and a gear 19 in mesh with the gear 17.

The clutch 24 is shown as including an annular chamber 25 in which is positioned an axially slidable ring 27 which may be moved by hydraulic fluid to the left, as viewed in the drawings for engaging a drive plate 29 fixed to the input shaft 10. Similarly, the clutch 26 includes an annular chamber 31 having a ring 33 movable by hydraulic fluid to the right for engaging a drive plate 35 connected to the gear set 12.

The present hydraulic system includes a pump 28 which is operative to draw hydraulic fluid from a sump 30 and feed this fluid through a conduit 32 to a fluid regulating valve 34. The valve 34 has a spring 36 which may be compressed by a fluid pressure in excess of a predetermined value for discharge of the fluid through a conduit 38 back to the pump intake and sump. Fluid is normally fed from the valve 34 to a relay valve 40 by means of a conduit 42. The valve 34 supplies pressure fluid to either the clutch 24 or the clutch 26 and at predetermined speeds of the shaft 22 is capable of transmitting a signal pressure through a conduit 46 for a purpose hereafter apparent.

The relay valve 40 includes a major bore 48 and a minor bore 50. A plunger 52 is slidably received in the relay valve 40 and includes a control land 54 slidably received in the minor bore 50 and a control land 56 slidably received in the major bore 48. The control lands 54 and 56 are joined by a spindle 58 for simultaneous movement. The plunger 52 is normally urged to the left, as viewed on the drawings, by means of a compression spring 60. In the position of the plunger 52 shown, pressure fluid may flow from the conduit 42 to the conduit 44 by means of an annular passage 61 formed in the bore 48. Thus working pressure is at all times made available to a kick-down valve 62.

The kick-down valve 62 includes a minor bore 64 and a major bore 66 defined in part by a shoulder 67. Slidably received within the minor bore 64 is a plunger 65 having a plurality of control lands 68, 70 and 72 maintained in axially spaced relation by means of a spindle 74. Within the major bore 66 is a piston 76 which is normally biased to the right, as viewed on the drawings, by means of a spring 78.

In the operating range of the vehicle, the clutch 24 is normally engaged by fluid pressure passing through the conduit 44, the minor bore 64 and a conduit 80. In the event that a lower ratio is desired within the operating range, the vehicle throttle, indicated by reference numeral 82, may be moved from the full throttle position indicated to the over-travel position. A shaft 84, which is connected to the plunger 65 moves the plunger to the right so that the control land 70 is interposed between the inlet from the conduit 44 and the outlet of the conduit 80. The movement of the plunger 65 is limited by a stud 69 extending axially from the land 72. By this arrangement, pressure fluid is permitted to flow from the bore 64 through a conduit 86 to the clutch 26 for drivingly connecting the gear set 12 to the impeller 16 for operation of the vehicle at a lower speed. As the control portion 72 moves to the right, an outlet 88 to exhaust is uncovered for passage of fluid from the clutch 24 back to sump by way of the conduit 80 and the bore 64. Upon release of the throttle to the "full throttle" position the plunger 65 is returned to the position illustrated in FIG. 1 by the spring 78. When the throttle 82 is moved to the "idle" position further movement of the plunger 65 is precluded by a shoulder 90a. Thus, the clutch 24 is normally engaged during the travel of the throttle 82 from "idle" to the "full throttle" detent position.

At higher operating speeds, according to the present invention, this downshift is prevented by means of a centrifugal governor 90 in a manner hereafter apparent.

The centrifugal governor 90 is of conventional type and is affixed to the converter output shaft 22. This governor is capable of producing a wide range of signal pressures in a well known manner. The governor 90 receives pressure fluid from the valve 34 by means of a conduit 94. This fluid is received in a passage 96 at all speed conditions of the output shaft 22 and may be transmitted through a passage 98 to a conduit 100 and a relay valve 40 by movement of a plunger 102 to its outermost position under the influence of centrifugal force. The plunger 102 includes a first control land 104 slidably received in a minor bore 106 and a second control land 108 slidably received in a major bore 110. Movement of the control land 104 to the outermost position affords communication between the passages 96 and 98, as will be apparent. Since the pressure fluid acts against the upper surface of the land 108 in opposition to the centrifugal force acting on the plunger 102, various output pressures are possible.

Fluid under pressure flows from the conduit 100 to one side of the control land 54 of the relay valve 40 for urging the plunger 52 to the right, as viewed in FIGURE 1, against the force of the spring 60. The control portion 56 is simultaneously moved to the right and communication is afforded between the conduit 42 and the conduit 46 and the piston 76 is thus urged into abutment with the shoulder 67. This fluid pressure within the major bore 66 of the kick-down valve 62 prevents manual movement of the throttle to the over-travel position and thus downshifting to a lower speed is prevented when the speed of the shaft 22 exceeds a predetermined value.

At a particular turbine speed it is desirable manually to shift into a lower speed range for greater efficiency. This speed is determinable for a particular transmission. According to the present invention the occurrence of this speed is indicated by means including an electrical circuit 92. The circuit 92 includes a battery 112 and an indicator light 114 and contacts 116 and 118 which may be closed by a pressure switch 120 operated by the fluid pressure in the conduit 100. When circuit 92 is closed the light 114 is energized and the operator becomes aware that further operation in the particular speed range is uneconomical and a downshift to a lower speed range is feasible.

When the speed of the shaft 22 drops below a predetermined value, the spring 60 urges the control land 54 to the left and the fluid in the major bore 66 is exhausted by means of the conduit 46 to sump through an outlet 115. Fluid from the clutch 26 may be exhausted through an outlet 126 when the plunger 65 is returned to the position shown.

Operation of the present transmission with the clutch 24 engaged may be considered to be in the economy range since this results in the lowest available ratio. When the clutch 26 is engaged the vehicle is considered to be in the performance range where economy is of secondary importance.

The control apparatus illustrated in FIGURE 2 is substantially the same as that of FIGURE 1 except that the clutch 26 is engaged at operating speeds in the economy range of operation. Identical parts are identified by the same reference numerals as the form of the invention shown in FIGURE 1. In this instance the clutch 26 is driven by the input shaft 10 through a step-up input gear set 12a which includes a gear 13a fixed to the shaft 10 and in mesh with a gear 15a, a gear 17a rotated by the gear 15a, and a gear 19a in mesh with the gear 17a and fixed to the drive plate. Fluid is normally fed to the clutch 26 by means of a conduit 86a while fluid may be fed to the clutch 24 when the plunger 65 is in the over-travel position through a conduit 80a. It will be noted that when the impeller 16 is rotated at an overdrive ratio through the gear set 12a downshifting may be effected by movement of the throttle 82 to the over-travel position so that upon engagement of the clutch 24 the impeller 16 may be driven directly through the input shaft 10. As in the principal form of the invention, this downshifting may be prevented when the turbine shaft 22 is rotating at a speed above a predetermined value by means of signal pressure within the major bore 66 of the kick-down valve 62. The remainder of the structure shown in FIGURE 2 is substantially the same as that disclosed in FIGURE 1.

The control apparatus of the above-described invention provides for downshifting the converter input for a particular transmission power ratio merely by moving the throttle 82 to a detent position beyond the normal full throttle position. By this means, additional power is required at the foot of the operator for increasing performance within a selected range. The present control apparatus also prevents downshifting from a particular ratio to a lower ratio when the speed of the output shaft exceeds a predetermined value.

The present transmission control is intended for use with an automatic shift transmission having a plurality of gears yielding a plurality of ratios in geometric steps and in which particular operating ranges may be manually selected. The indicating means above-described is operative at a much lower signal pressure than that required for blocking the kick-down and is effective to inform the operator that a lower speed range would be feasible.

While I have described my invention in connection with certain specific constructions and arrangements it is to be understood that this is by way of illustration and not by way of limitation and the scope of my invention is defined solely by the appended claims which should be construed as broadly as the prior art will permit.

I claim:

1. A control apparatus for an automatic transmission having an input shaft, an input gear set, a torque converter including an impeller, a turbine and a stator, said input gear set being adapted operably to connect said input shaft and said impeller, and an output shaft for said converter; comprising a first clutch normally operative to interconnect said input shaft and said impeller to transmit power to said impeller at a predetermined speed ratio, a second clutch operative upon actuation to transmit power to said impeller through said gear set at a predetermined lower ratio, manually actuatable means for controlling the actuation of said second clutch when a lower input ratio to said impeller is desired and means for preventing actuation of said second clutch above a predetermined vehicle speed.

2. A control apparatus for an automatic transmission having an input shaft, an input gear set, a torque converter having an impeller, a stator and a turbine, an output shaft for said converter, comprising means automatically operable selectively drivingly to connect said input gear set to said impeller, said means including a source of working fluid, a manually actuatable valve, a first clutch for selectively drivingly connecting said input shaft and said impeller, a second clutch for selectively drivingly connecting said input shaft and said impeller, one of said clutches being operable to afford transmission of power through said input gear set, said working fluid being operable at one position of said valve to engage one of said clutches for rotating said impeller at a relatively high gear ratio in drive range, said valve being movable to another position to effect engagement of the other of said clutches to afford increased performance, and means for inhibiting movement of said valve to the latter position when the speed of the output shaft exceeds a predetermined value, said means including a centrifugal governor for effecting a predetermined signal pressure.

3. A control apparatus for an automatic transmission having an input shaft, an input gear set, a torque converter, an output shaft for said converter, comprising a first clutch operative upon actuation drivingly to connect said input gear set to the impeller of said converter, a second clutch operative upon actuation drivingly to connect said input shaft directly to said impeller, manually operable means for selectively controlling the actuation of one or the other of said clutches for rotation of said impeller at an economical speed, and automatic means for preventing operation of said first clutch at a speed in excess of a predetermined speed.

4. A control apparatus for an automatic transmission having an input shaft, an input gear set, a torque converter, an output shaft for said converter, comprising a first clutch operative upon actuation drivingly to connect said input gear set to the impeller of said converter, a second clutch operative upon actuation drivingly to connect said input shaft directly to said impeller manually operable means for selectively controlling the actuation of one or the other of said clutches for rotation of said impeller at an economical speed, and automatic means for preventing operation of said first clutch at a speed in excess of a predetermined speed, said last-named means including a centrifugal governor driven by said output shaft.

References Cited in the file of this patent

UNITED STATES PATENTS

| | | |
|---|---|---|
| 2,187,831 | Lange | Jan. 23, 1940 |
| 2,214,100 | Claytor | Sept. 10, 1940 |
| 2,301,451 | Pollard | Nov. 10, 1942 |
| 2,682,177 | Kelbel | June 29, 1954 |
| 2,728,427 | Lucia | Dec. 27, 1955 |
| 2,933,944 | Carnagua | Apr. 26, 1960 |

FOREIGN PATENTS

| | | |
|---|---|---|
| 484,584 | Great Britain | May 6, 1938 |
| 509,763 | Great Britain | July 17, 1939 |